US007801037B2

(12) United States Patent
Wang

(10) Patent No.: US 7,801,037 B2
(45) Date of Patent: Sep. 21, 2010

(54) METHOD AND APPARATUS FOR BINDING REDUNDANCY VERSIONS WITH A SYSTEM FRAME NUMBER AND SUBFRAME NUMBERS

(75) Inventor: Fan Wang, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 12/771,972

(22) Filed: Apr. 30, 2010

(65) Prior Publication Data

US 2010/0202474 A1 Aug. 12, 2010

Related U.S. Application Data

(63) Continuation of application No. PCT/CN2009/073206, filed on Aug. 12, 2009.

(30) Foreign Application Priority Data

Sep. 22, 2008 (CN) ........................ 2008 1 0161802

(51) Int. Cl.
*H04L 12/56* (2006.01)
*H04J 1/16* (2006.01)

(52) U.S. Cl. ........................ 370/230; 370/252; 370/394

(58) Field of Classification Search ................. 370/252, 370/230, 389, 394
See application file for complete search history.

(56) References Cited

U.S. PATENT DOCUMENTS

2009/0327828 A1* 12/2009 Ojala et al. ................. 714/749

FOREIGN PATENT DOCUMENTS

CN 1965521 A 5/2007
CN 101192878 A 4/2008

OTHER PUBLICATIONS

3rd Generation Partnership Project, "Technical Specification Group Radio Access Network; High Speed Downlink Packet Access (HSDPA); Overall description; Stage 2 (Release 8)" (3GPP TS 25.308 V8.2.0) (May 2008).
State Intellectual Property Office of the People's Republic of China, International Search Report in International Patent Application No. PCT/CN2009/073206 (Nov. 19, 2009).

* cited by examiner

*Primary Examiner*—John Pezzlo
(74) *Attorney, Agent, or Firm*—Leydig, Voit & Mayer, Ltd.

(57) ABSTRACT

A method and apparatus for binding Redundancy Versions (RVs) with a System Frame Number (SFN) and subframe numbers are disclosed. The method includes: choosing any five (5) continuous subframes within a transmission window of a System Information (SI-x) message according to the subframe numbers of an SFN; and binding the SFN and subframe numbers of the five (5) continuous subframes with RVs of the SI-x message. Because RVs are bound with an SFN and subframe numbers, when a transmission window of an SI-x message is longer than or equal to 5 ms, system frames and subframes are bound with RVs of the SI-x message so that the RV retransmission of the SI-x message is guaranteed.

13 Claims, 4 Drawing Sheets s201 — Choose 5 continuous subframes according to subframe numbers of an SFN s202 — Bind the SFN and subframe numbers of the 5 continuous subframes with RVs of the SI-x message

METHOD AND APPARATUS FOR BINDING REDUNDANCY VERSIONS WITH A SYSTEM FRAME NUMBER AND SUBFRAME NUMBERS

CROSS-REFERENCE TO RELATED APPLICATIONS

This application is a continuation of International Application No. PCT/CN2009/073206, filed on Aug. 12, 2009, which claims priority to Chinese Patent Application No. 200810161802.5, filed on Sep. 22, 2008, both of which are hereby incorporated by reference in their entireties.

FIELD OF THE INVENTION

The present invention relates to communications, and in particular, to a method and apparatus for binding redundancy versions with a system frame number and subframe numbers.

BACKGROUND OF THE INVENTION

In a conventional Downlink Control Indicator (DCI) format 1C is used to schedule Paging Channel (PCH), Random Access Channel (RACH) responses message and Broadcast Channel (BCCH) message (SIB1 and SI-x, x=2, . . . , 8). Conventionally, the following definitions are given:

Redundancy Version (RV): 0 bit long, i.e. implicit indication.

The RVs of System Information Block 1 (SIB1) are bound with a System Frame Number (SFN) and subframe numbers, and different RVs are used in an 80 ms. The RV sequence of SIB1 is RV0, RV2, RV3, and RV1. The RVs of System Information x (SI-x) are bound with an SFN and subframe numbers also.

In conventional systems, the duration of each system frame is 10 ms and system frames are numbered from 0. One system frame contains 10 subframes, numbered from 0 to 9. The relation in time sequence of system frames and subframes is shown in FIG. 1.

Within an 80-ms cycle, there are 8 system frames, in which SIB1 is transmitted on subframe numbered 5 of each system frame having an even SFN. The RV sequence of SIB1 is 0, 2, 3, 1. SI-x is transmitted within a specified transmission window, the length of which may be {1, 2, 5, 10, 20, 40} ms. Each SI-x message is transmitted with a certain number of retransmissions within the transmission window. Each retransmission is done on one subframe and the transmission window of every SI-x message is close to each other but cannot overlap. The transmission window of SI-x can overlap with the transmission window of SIB1 but an SI-x message cannot be transmitted on a subframe where SIB1 is transmitted.

In conventional systems, there is no solution for binding the RVs of SI-x with an SFN and subframe numbers and as a result, the performance of SI-x message retransmissions cannot be guaranteed. The present invention improves upon conventional systems as described below.

SUMMARY OF THE INVENTION

Aspects of the present invention provide a method and apparatus for binding Redundancy Versions (RVs) with a System Frame Number (SFN) and subframe numbers so as to guarantee the retransmission of System Information (SI-x) messages.

According to an aspect of the present invention, a method for binding RVs with an SFN and subframe numbers is provided, which may comprise: choosing 5 continuous subframes within a transmission window of an SI-x message according to subframe numbers of an SFN; and binding the SFN and subframe numbers of the 5 continuous subframes with RVs of the SI-x message.

According to another aspect of the present invention, an apparatus for binding RVs with an SFN and subframe numbers is provided, which may include: a subframe choosing unit, configured to choose 5 continuous subframes within a transmission window of an SI-x message according to subframe numbers of an SFN; and a binding unit, configured to bind the SFN and subframe numbers of the 5 continuous subframes with RVs of the SI-x message.

According to another aspect of the present invention, a method for binding RVs with an SFN and subframe numbers is provided, which may comprise: choosing five continuous subframes, beginning with a subframe numbered N, within a transmission window of a system information (SI-x) message, wherein when the SFN for the subframe numbered N is odd, N is an integer from 0 to 9; or when the SFN for the subframe numbered N is even, N is any one of 0, 6, 7, 8 and 9; setting an RV sequence of four time-sequenced subframes in the five continuous subframes as $S_{RV}(\mathbf{0})$, $S_{RV}(\mathbf{1})$, $S_{RV}(\mathbf{2})$, $S_{RV}(\mathbf{3})$; and setting an RV of a remaining subframe in the five continuous subframes as any one of $S_{RV}(\mathbf{0})$, $S_{RV}(\mathbf{1})$, $S_{RV}(\mathbf{2})$ and $S_{RV}(\mathbf{3})$ Compared with conventional systems, aspects of the present invention provide the following benefit:

Because RVs are bound with an SFN and subframe numbers, when the transmission window of SI-x message is longer than or equal to 5 ms, system frames and subframes are bound with RVs of the SI-x message so that the RV retransmission of the SI-x message is guaranteed.

DETAILED DESCRIPTION OF THE INVENTION

The present invention is described in detail with reference to the accompanying drawings and specific embodiments hereunder.

Figure 1:
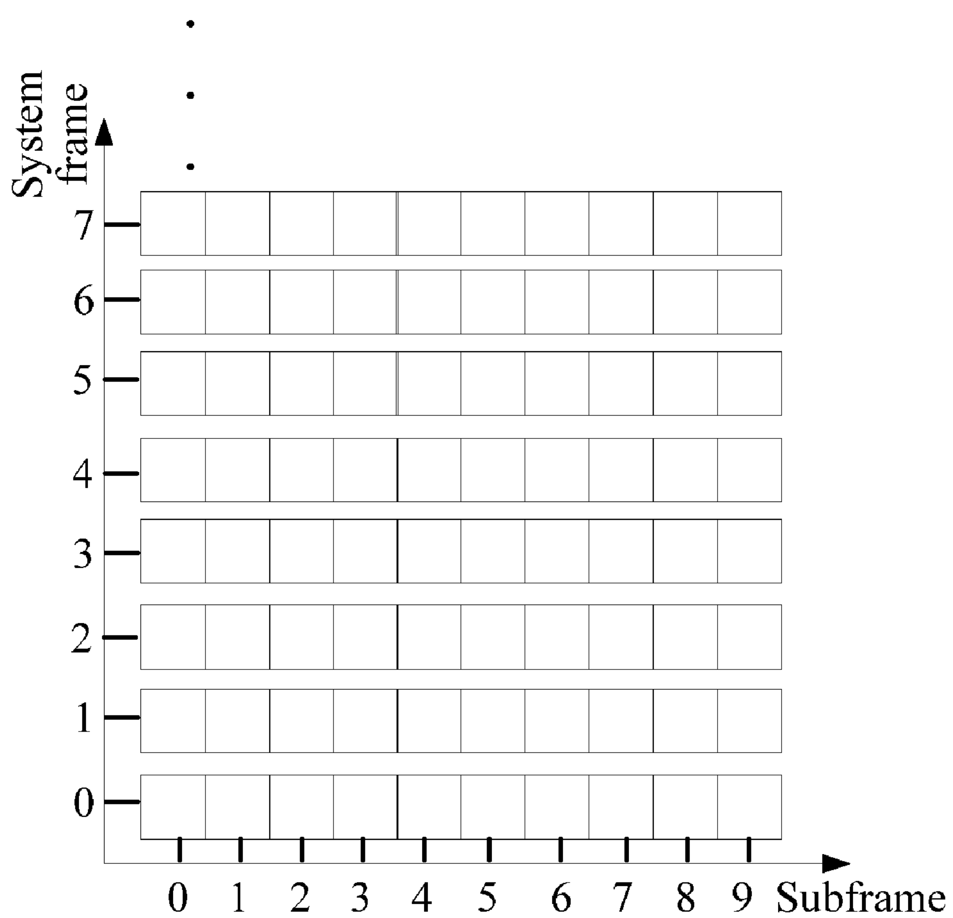
FIG. 1 shows the time sequence of conventional system frames and subframes.
Figure 2:
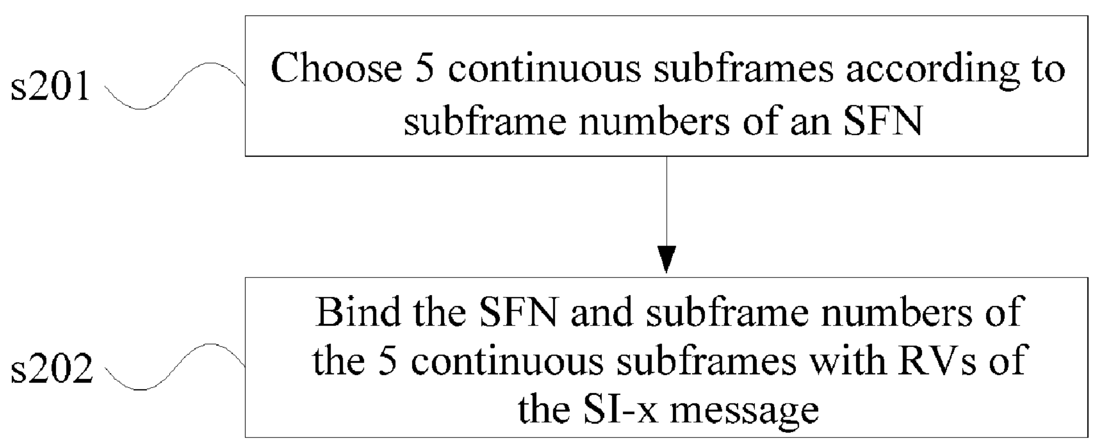
FIG. 2 shows a flowchart of a method for binding RVs with an SFN and subframe numbers according to an embodiment of the present invention.

FIG. 2 shows a method for binding RVs with an SFN and subframe numbers according to an embodiment of the present invention. The method includes the following steps:

Step s201: Any 5 continuous subframes are chosen according to subframe numbers of an SFN.

In this step, the choice is made within a transmission window of an SI-x message.

Step s202: RVs of the SI-x message is bound with the SFN and subframe numbers of the 5 continuous subframes.

In this step, RVs of the SI-x message are set for the 5 continuous subframes, and thus the RVs of the SI-x message are bound with the SFN and subframe numbers.

With the method provided according to the above embodiment, the RVs are bound with the SFN and subframe numbers. When a transmission window of an SI-x message is longer than or equal to 5 subframes, the performance of RV retransmission of the SI-x message is assured.

The present invention will be explained in detail with specific application scenarios.

Another embodiment of the present invention provides a method for binding RVs with an SFN and subframe numbers. In the embodiment, an RV sequence of an SI-x message during retransmission is set as $S_{RV}=\{S_{RV}(\mathbf{0}), S_{RV}(\mathbf{1}), S_{RV}(\mathbf{2}), S_{RV}(\mathbf{3})\}$, where $S_{RV}=\{S_{RV}(\mathbf{0}), S_{RV}(\mathbf{1}), S_{RV}(\mathbf{2}), S_{RV}(\mathbf{3})\}=\{0,2,3,1\}$.

Those skilled in the art understand that an RV sequence of an SI-x message during retransmission may take other sequences.

Figure 3:
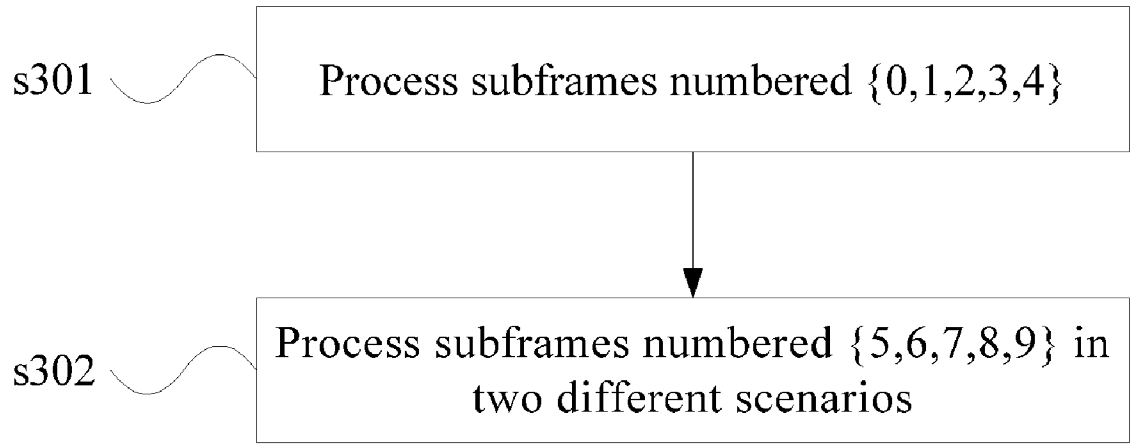
FIG. 3 shows a flowchart of a method for binding RVs with an SFN and subframe numbers according to another embodiment of the present invention.

Specifically, as shown in FIG. 3, with respect to 5 continuous subframes beginning with a subframe numbered 0 or 5, the binding method includes the following steps:

Step s301: For subframes numbered {0, 1, 2, 3, 4}, 4 subframes are chosen from said 5 subframes and the 4 subframes are in a time sequence. An RV sequence of the 4 subframes is set as $S_{RV}(\mathbf{0}), S_{RV}(\mathbf{1}), S_{RV}(\mathbf{2}), S_{RV}(\mathbf{3})$, and the RV of the remaining subframe in the 5 subframes is set as a value in $S_{RV}=\{S_{RV}(\mathbf{0}), S_{RV}(\mathbf{1}), S_{RV}(\mathbf{2}), S_{RV}(\mathbf{3})\}$.

Step s302: For subframes numbered {5, 6, 7, 8, 9}, the processing depends on specific scenarios.

In a scenario of system frames with even SFNs (SFN=0, 2, 4 . . . ), for subframes numbered {6, 7, 8, 9}, an RV sequence of the subframes is set as $S_{RV}(\mathbf{0}), S_{RV}(\mathbf{1}), S_{RV}(\mathbf{2}), S_{RV}(\mathbf{3})$.

Preferably, RVs of subframes numbered 5 may be set as $S_{RV}=(\lfloor(n_f \bmod 8)/2\rfloor)$, wherein $n_f$ stands for the SFN.

This will assure that a RV sequence of SIB1 is $S_{RV}(\mathbf{0}), S_{RV}(\mathbf{1}), S_{RV}(\mathbf{2}), S_{RV}(\mathbf{3})$.

In a scenario of system frames with odd SFNs (SFN=1, 3, 5 . . . ), 4 subframes that are in a time sequence are chosen from subframes numbered {5, 6, 7, 8, 9}. An RV sequence of the 4 subframes is set as $S_{RV}(\mathbf{0}), S_{RV}(\mathbf{1}), S_{RV}(\mathbf{2}), S_{RV}(\mathbf{3})$, and RVs of remaining ones in subframes numbered {5, 6, 7, 8, 9} are set as any value in $S_{RV}=\{S_{RV}(\mathbf{0}), S_{RV}(\mathbf{1}), S_{RV}(\mathbf{2}), S_{RV}(\mathbf{3})\}$.

With the method provided according to the above embodiment, RVs are bound with the SFN and subframe numbers. When a transmission window of an SI-x message is longer than or equal to 5 ms, 4 time-sequenced subframes whose RVs are arranged in a certain order can be found in any transmission window so that the performance of retransmission for SI-x message is assured.

Those skilled in the art can understand that it is unnecessary to use 5 continuous subframes beginning with a subframe numbered N as a group for binding RVs with an SFN and subframe numbers, wherein N is 0 or 5. The subframe number N may be an integer between 0 and 9. Or, in certain scenarios, RVs of an SI-x message may be bound by subframes one by one.

When N is not 0 and 5>N−1, a value in $S_{RV}=\{S_{RV}(\mathbf{0}), S_{RV}(\mathbf{1}), S_{RV}(\mathbf{2}), S_{RV}(\mathbf{3})\}$ may be set randomly as the RV of subframes numbered 0 to N−1 of system frame numbered 0.

When N is not 0 and 5≦N−1, the RV of a subframe numbered 5 is SRV(0) and a value in $S_{RV}=\{S_{RV}(\mathbf{0}), S_{RV}(\mathbf{1}), S_{RV}(\mathbf{2}), S_{RV}(\mathbf{3})\}$ is set randomly as the RV of subframes numbered 0 to 4 and 6 to N−1.

The RV binding of system frames is continuous and not repeated. From the beginning subframe numbered N of system frame numbered 0, every 5 subframes are bound continuously without repetition.

The present invention will be further explained with an exemplary embodiment where a transmission window of an SI-x message is 5 ms.

Figure 4:
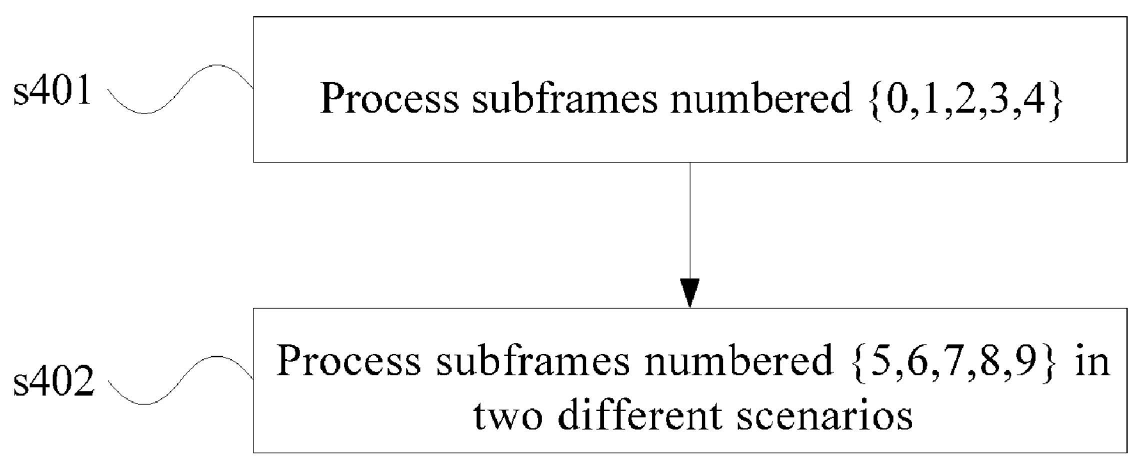
FIG. 4 shows a flowchart of a method for binding RVs with an SFN and subframe numbers according to still another embodiment of the present invention.

Still in another embodiment of the present invention a method for binding RVs and an SFN and subframe numbers is provided. As shown in FIG. 4, with respect to 5 continuous subframes beginning with subframe numbered 0 or 5, the binding method includes following steps:

Step s401: For subframes numbered {0, 1, 2, 3, 4}, subframes numbered 0, 1, 2 and 3 are chosen. An RV sequence of subframes numbered 0, 1, 2 and 3 is set as $S_{RV}(\mathbf{0}), S_{RV}(\mathbf{1}), S_{RV}(\mathbf{2}), S_{RV}(\mathbf{3})$, and an RV of a subframe numbered 4 is set as $S_{RV}=((\lfloor 3+2*n_f+(n_f \bmod 8)/2\rfloor) \bmod 4)$, wherein $n_f$ stands for the SFN.

Thus, among 5 continuous subframes beginning with a subframe numbered 0, 4 time-sequenced subframes can be found with a RV sequence as $S_{RV}(\mathbf{0}), S_{RV}(\mathbf{1}), S_{RV}(\mathbf{2}), S_{RV}(\mathbf{3})$. An enhanced NodeB (eNB) may schedule these subframes to retransmit SI-x messages. Because of the difference in RVs, the performance of retransmission is improved.

Step s402: For subframes numbered {5, 6, 7, 8, 9}, the processing depends on specific scenarios:

In a scenario of system frames with even SFNs (SFN=0, 2, 4 . . . ), for subframes numbered {6,7,8,9}, an RV sequence of subframes numbered {6,7,8,9} as $S_{RV}(\mathbf{0}), S_{RV}(\mathbf{1}), S_{RV}(\mathbf{2}), S_{RV}(\mathbf{3})$.

Thus, among 5 continuous subframes of a system frame with even SFN beginning with a subframe numbered 5, 4 time-sequenced subframes can be found with an RV sequence as $S_{RV}(\mathbf{0}), S_{RV}(\mathbf{1}), S_{RV}(\mathbf{2}), S_{RV}(\mathbf{3})$. An eNB may schedule these subframes to retransmit SI-x messages. Because of the difference in RVs, the performance of retransmission is improved.

Further, RVs of subframes numbered 5 may be set as $S_{RV}=(\lfloor(n_f \bmod 8)/2\rfloor)$, wherein $n_f$ stands for the SFN.

Thus, within an 80-ms cycle, an RV sequence of subframes numbered 5 of system frames with even SFNs in 8 system frames is $S_{RV}(\mathbf{0}), S_{RV}(\mathbf{1}), S_{RV}(\mathbf{2}), S_{RV}(\mathbf{3})$. This guarantees available resources for scheduling in an eNB for SIB1 transmission.

In a scenario of system frames with odd SFNs (SFN=1, 3, 5 . . . ), subframes numbered 6, 7, 8 and 9 are chosen from subframes numbered {5,6,7,8,9}, an RV sequence of the subframes numbered 6, 7, 8 and 9 is set as $S_{RV}(\mathbf{0}), S_{RV}(\mathbf{1}), S_{RV}(\mathbf{2}), S_{RV}(\mathbf{3})$ and RVs of remaining subframes numbered 5 are set as $S_{RV}((2*n_f+\lfloor(n_f \bmod 8)/2\rfloor) \bmod 4)$, wherein $n_f$ stands for the SFN.

Thus, among 5 continuous subframes of system frames with odd SFNs beginning with a subframe numbered 5, 4 time-sequenced subframes can be found with an RV sequence as $S_{RV}(\mathbf{0}), S_{RV}(\mathbf{1}), S_{RV}(\mathbf{2}), S_{RV}(\mathbf{3})$. An eNB may schedule these subframes to retransmit SI-x messages. Because of the difference in RVs, the performance of retransmission is improved.

Figure 5:
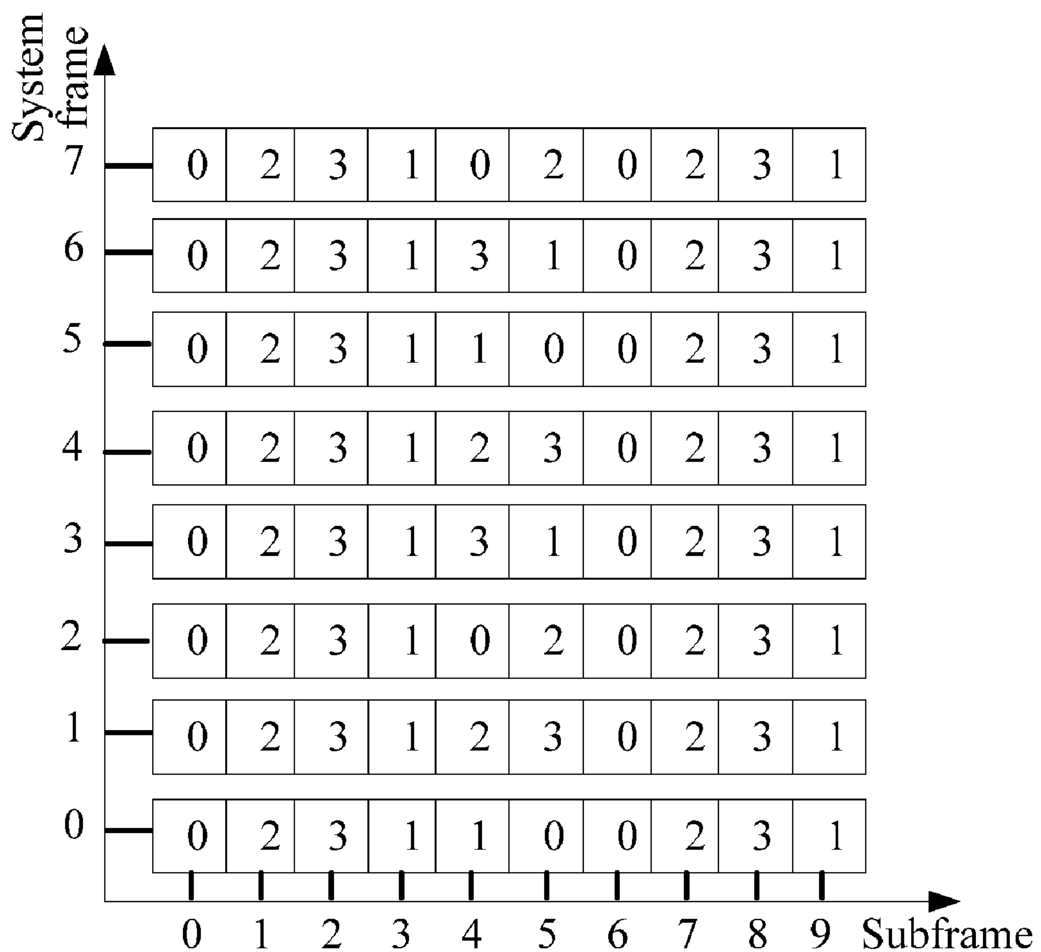
FIG. 5 shows an exemplary of RV sequence of subframes in a method for binding RVs with an SFN and subframe numbers according to an embodiment of the present invention.

After the above steps, RV values of subframes in each system frame are obtained as shown in FIG. 5.

According to the method for binding RVs with an SFN and subframe numbers in the embodiment of the present invention, with respect to any 5 continuous subframes beginning with a subframe numbered 0 or 5, among subframes that are not used by SIB1, 4 time-sequenced subframes can be found with an RV sequence as $S_{RV}(\mathbf{0})$, $S_{RV}(\mathbf{1})$, $S_{RV}(\mathbf{2})$, $S_{RV}(\mathbf{3})$. This facilitates the resource scheduling of an eNB when a transmission window of an SI-x message is 5 ms and therefore improves the performance of retransmission of SI-x messages.

Further, in every 2 continuous system frames beginning with a system frame numbered 0, every 5 continuous subframes are put into one group to get 4 subframe groups. In a subframe group, 4 time-sequenced subframes can be found; these subframes are not used for transmitting SIB1 messages and an RV sequence of these subframes is $S_{RV}(\mathbf{0})$, $S_{RV}(\mathbf{1})$, $S_{RV}(\mathbf{2})$, $S_{RV}(\mathbf{3})$.

Because of the even distribution in time and 4 groups available for scheduling, the scheduling flexibility of an eNB is enhanced and good time diversity can be obtained. This will facilitate the resource scheduling of the eNB when a transmission window of an SI-x message is longer than 5 ms and improve the performance of the retransmission of SI-x messages.

Further, within an 80-ms cycle, an RV sequence of a subframe numbered 5 of system frames with even SFNs in 8 system frames is $S_{RV}(\mathbf{0})$, $S_{RV}(\mathbf{1})$, $S_{RV}(\mathbf{2})$, $S_{RV}(\mathbf{3})$. This guarantees available resources for scheduling in an eNB for SIB1 transmission.

Figure 6:
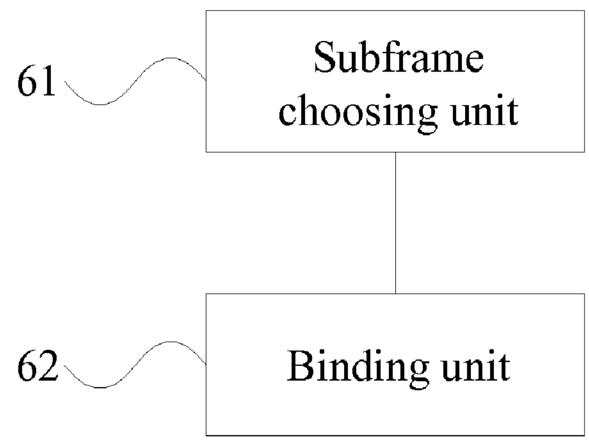
FIG. 6 shows a simplified structure of an apparatus for binding RVs with an SFN and subframe numbers according to an embodiment of the present invention.

In an embodiment of the present invention an apparatus for binding RVs with an SFN and subframe numbers is provided. As shown in FIG. 6, the apparatus includes a subframe choosing unit 61 and a binding unit 62.

The subframe choosing unit 61 is configured to choose any 5 continuous subframes within a transmission window of an SI-x message according to subframe numbers of an SFN. The binding unit 62 is configured to bind the RVs of the SI-x message with the SFN and subframe numbers of the any 5 continuous subframes.

With the apparatus provided according to the embodiment of the present invention, RVs are bound with an SFN and subframe numbers. When a transmission window of an SI-x message is longer than or equal to 5 ms, the performance of retransmission of the SI-x message is assured.

Figure 7:
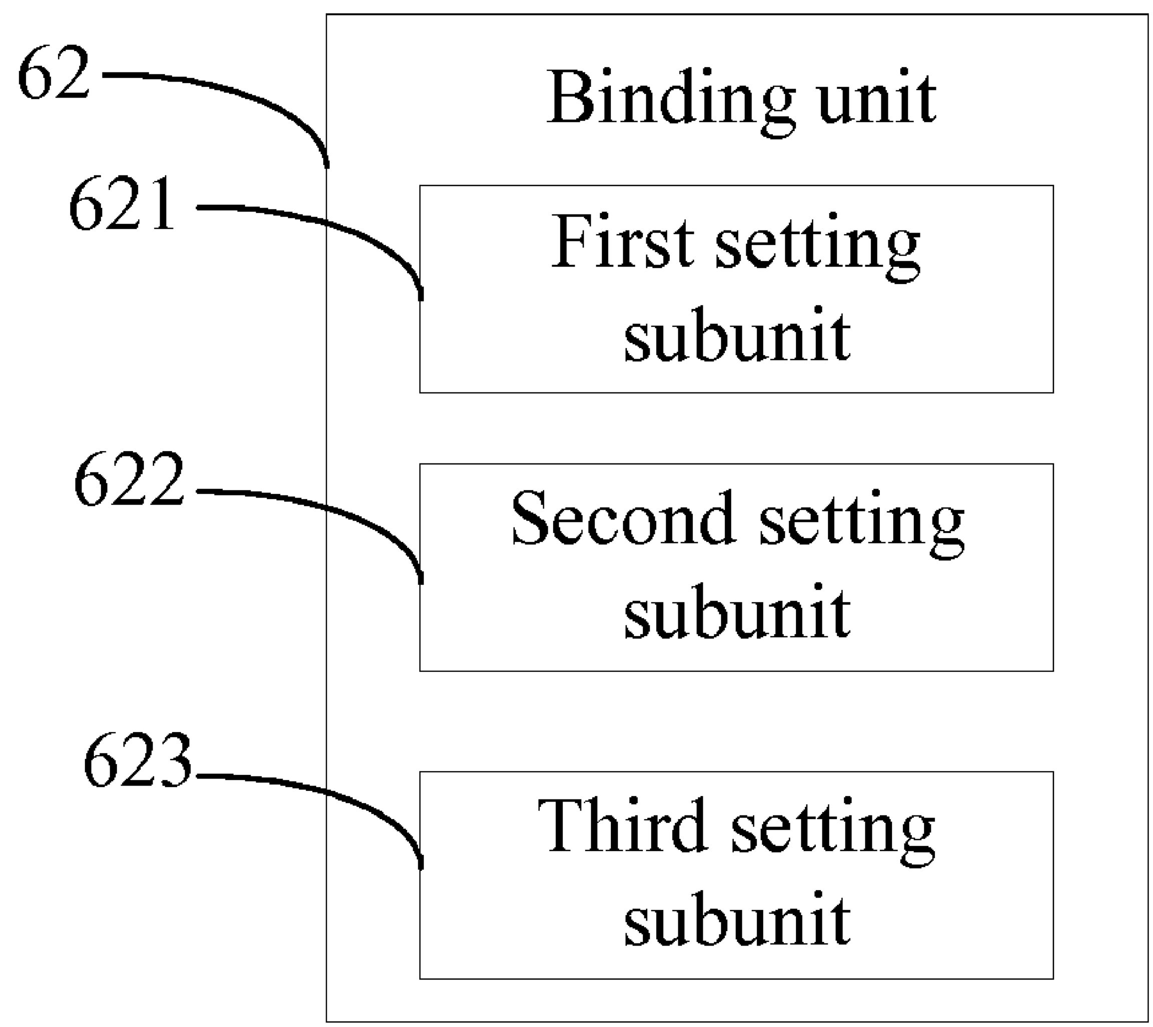
FIG. 7 shows a simplified structure of an apparatus for binding RVs with an SFN and subframe numbers according to another embodiment of the present invention.

Further, as shown in FIG. 7, the binding unit 62 may include: a first setting subunit 621, a second setting subunit 622 and a third setting subunit 623.

The first setting subunit 621 is configured to set an RV sequence of 4 time-sequenced subframes in the 5 continuous subframes as $S_{RV}(\mathbf{0})$, $S_{RV}(\mathbf{1})$, $S_{RV}(\mathbf{2})$, $S_{RV}(\mathbf{3})$ and to set an RV of a remaining subframe in the 5 continuous subframes as any value in $S_{RV}(\mathbf{0})$, $S_{RV}(\mathbf{1})$, $S_{RV}(\mathbf{2})$, $S_{RV}(\mathbf{3})$, wherein none of subframe numbers of the 5 continuous subframes beginning with a subframe numbered N is 5, and N is an integer from 0 to 9.

The second setting subunit 622 is configured to set an RV sequence of 4 subframes in the 5 continuous subframes other than a subframe numbered 5 as $S_{RV}(\mathbf{0})$, $S_{RV}(\mathbf{1})$, $S_{RV}(\mathbf{2})$, $S_{RV}(\mathbf{3})$, and to set an RV of the subframe numbered 5 as $S_{RV}=(\lfloor(n_f \bmod 8)/2\rfloor)$, where $n_f$ stands for the SFN and $S_{RV}=\{S_{RV}(\mathbf{0}), S_{RV}(\mathbf{1}), S_{RV}(\mathbf{2}), S_{RV}(\mathbf{3})\}$, wherein one subframe number of the 5 continuous subframes beginning with a subframe numbered N is 5 and the SFN is even.

The third setting subunit 623 is configured to set an RV sequence of 4 time-sequenced subframes in the 5 continuous subframes as $S_{RV}(\mathbf{0})$, $S_{RV}(\mathbf{1})$, $S_{RV}(\mathbf{2})$, $S_{RV}(\mathbf{3})$, and to set an RV of a remaining subframe in the 5 continuous subframes as any value in $S_{RV}(\mathbf{0})$, $S_{RV}(\mathbf{1})$, $S_{RV}(\mathbf{2})$, $S_{RV}(\mathbf{3})$, wherein one subframe number of the 5 continuous subframes beginning with subframe numbered N is 5 and the SFN is odd.

The specific binding procedure is described in the method embodiments and is omitted here.

With the apparatus provided according to the embodiment of the present invention, with respect to any 5 continuous subframes beginning with a subframe numbered 0 or 5, among subframes that are not used by SIB1, 4 time-sequenced subframes can be found with an RV sequence as $S_{RV}(\mathbf{0})$, $S_{RV}(\mathbf{1})$, $S_{RV}(\mathbf{2})$, $S_{RV}(\mathbf{3})$. This facilitates the resource scheduling of an eNB when the transmission window of SI-x is 5 ms and therefore improves the performance of retransmission of SI-x messages.

Based on the descriptions of the foregoing embodiments, those skilled in art can be clear that, the embodiments of the present invention can be implemented by hardware or implemented by software on a necessary general hardware platform. Based on such understanding, the technical solution of the present invention may be embodied in software. The software may be stored in a nonvolatile storage medium, such as a CD-ROM, a USB disk, and a mobile disk. The software includes a number of instructions that enable a computer device (which may be a personal computer, a server or a network device) to execute the method according to the embodiments of the present invention.

Although the invention has been described through exemplary embodiments, the invention is not limited to such embodiments. It is apparent that those skilled in the art can make various modifications and variations to the invention without departing from the spirit and scope of the present invention. The invention is intended to cover the modifications and variations provided that they fall in the scope of protection defined by the claims or their equivalents.

What is claimed is:

1. A method for binding redundancy versions (RVs) with a system frame number (SFN) and subframe numbers, comprising:

choosing five continuous subframes within a transmission window of a system information (SI-x) message according to subframe numbers of an SFN; and binding RVs of the SI-x message with the SFN and subframe numbers of the five continuous subframes.

2. The method according to claim 1, wherein the binding RVs of the SI-x message with the SFN and subframe numbers of the five continuous subframes comprises:

setting an RV sequence of four time-sequenced subframes in the five continuous subframes as $S_{RV}(\mathbf{0})$, $S_{RV}(\mathbf{1})$, $S_{RV}(\mathbf{2})$, $S_{RV}(\mathbf{3})$; and setting an RV of a remaining subframe in the five continuous subframes as any one of $S_{RV}(\mathbf{0})$, $S_{RV}(\mathbf{1})$, $S_{RV}(\mathbf{2})$ and $S_{RV}(\mathbf{3})$;

wherein none of subframe numbers of the five continuous subframes beginning with N is 5 and N is an integer from 0 to 9.

3. The method according to claim 1, wherein the binding RVs of the SI-x message with the SFN and subframe numbers of the five continuous subframes comprises:

setting an RV sequence of four subframes other than the subframe numbered 5 in the five continuous subframes as $S_{RV}(\mathbf{0})$, $S_{RV}(\mathbf{1})$, $S_{RV}(\mathbf{2})$, $S_{RV}(\mathbf{3})$; and setting an RV of the subframe numbered 5 as $S_{RV}=(\lfloor(n_f \bmod 8)/2\rfloor)$, wherein $n_f$ stands for the SFN and $S_{RV}=\{S_{RV}(\mathbf{0}), S_{RV}(\mathbf{1}), S_{RV}(\mathbf{2}), S_{RV}(\mathbf{3})\}$;

wherein one of subframe numbers of the five continuous subframes beginning with N is 5, and the SFN is even.

4. The method according to claim 1, wherein the binding RVs of the SI-x message with the SFN and subframe numbers of the five continuous subframes comprises:

setting an RV sequence of four time-sequenced subframes in the five continuous subframes as $S_{RV}(\mathbf{0})$, $S_{RV}(\mathbf{1})$, $S_{RV}(\mathbf{2})$, $S_{RV}(\mathbf{3})$; and setting an RV of a remaining subframe in the five continuous subframes as any one of $S_{RV}(\mathbf{0})$, $S_{RV}(\mathbf{1})$, $S_{RV}(\mathbf{2})$ and $S_{RV}(\mathbf{3})$;

wherein one of subframe numbers of the five continuous subframes beginning with N is 5, and the SFN is odd.

5. The method according to claim 1, wherein the length of the transmission window of the SI-x message is 5 ms, 10 ms, 20 ms or 40 ms.

6. An apparatus for binding redundancy versions (RVs) with a system subframe number (SFN) and subframe numbers, comprising:

a subframe choosing unit, configured to choose five continuous subframes within a transmission window of a system frame according to subframe numbers of an SFN; and a binding unit, configured to bind RVs of the system information (SI-x) message with the SFN and subframe numbers of the five continuous subframes.

7. The apparatus according to claim 6, wherein the binding unit comprises:

a first setting subunit, configured to set an RV sequence of four time-sequenced subframes in the five continuous subframes as $S_{RV}(\mathbf{0})$, $S_{RV}(\mathbf{1})$, $S_{RV}(\mathbf{2})$, $S_{RV}(\mathbf{3})$, and to set an RV of a remaining subframe in the five continuous subframes as any one of $S_{RV}(\mathbf{0})$, $S_{RV}(\mathbf{1})$, $S_{RV}(\mathbf{2})$ and $S_{RV}(\mathbf{3})$, wherein none of subframe numbers of the five continuous subframes beginning with N is 5 and N is an integer from 0 to 9.

8. The apparatus according to claim 6, wherein the binding unit further comprises:

a second setting subunit, configured to set an RV sequence of four subframes other than the subframe numbered 5 in the five continuous subframes as $S_{RV}(\mathbf{0})$, $S_{RV}(\mathbf{1})$, $S_{RV}(\mathbf{2})$ and $S_{RV}(\mathbf{3})$, and to set an RV of the subframe numbered 5 as $S_{RV}=(\lfloor(n_f \bmod 8)/2\rfloor)$, wherein $n_f$ stands for the SFN and $S_{RV}=\{S_{RV}(\mathbf{0}), S_{RV}(\mathbf{1}), S_{RV}(\mathbf{2}), S_{RV}(\mathbf{3})\}$, wherein a subframe in the five continuous subframes beginning with N is numbered 5 and the SFN is even.

9. The apparatus according to claim 6, wherein the binding unit further comprises:

a third setting subunit, configured to set an RV sequence of four time-sequenced subframes as $S_{RV}(\mathbf{0})$, $S_{RV}(\mathbf{1})$, $S_{RV}(\mathbf{2})$ $S_{RV}(\mathbf{3})$, and to set an RV of a remaining subframe in the five continuous subframes as any one of $S_{RV}(\mathbf{0})$, $S_{RV}(\mathbf{1})$, $S_{RV}(\mathbf{2})$ and $S_{RV}(\mathbf{3})$, wherein a subframe in the five continuous subframes beginning with N is numbered 5 and the SFN is odd.

10. A method for binding redundancy versions (RVs) with a system frame number (SFN) and subframe numbers, comprising:

choosing five continuous subframes, beginning with a subframe numbered N, within a transmission window of a system information (SI-x) message, wherein when the SFN for the subframe numbered N is odd, N is an integer from 0 to 9; or when the SFN for the subframe numbered N is even, N is any one of 0, 6, 7, 8 and 9;

setting an RV sequence of four time-sequenced subframes in the five continuous subframes as $S_{RV}(\mathbf{0})$, $S_{RV}(\mathbf{1})$, $S_{RV}(\mathbf{2})$, $S_{RV}(\mathbf{3})$; and setting an RV of a remaining subframe in the five continuous subframes as any one of $S_{RV}(\mathbf{0})$, $S_{RV}(\mathbf{1})$, $S_{RV}(\mathbf{2})$ and $S_{RV}(\mathbf{3})$.

11. The method according to claim 10, wherein the four time-sequenced subframes begins with the subframe numbered N, and $S_{RV}(\mathbf{0})$ equals to 0, $S_{RV}(\mathbf{1})$ equals to 2, $S_{RV}(\mathbf{2})$ equals to 3, $S_{RV}(\mathbf{3})$ equals to 1.

12. The method according to claim 10, wherein the length of the transmission window is any one of 5 ms, 10 ms, 20 ms and 40 ms.

13. The method according to claim 10, wherein the method further comprises:

choosing five continuous subframes, beginning with a subframe numbered N, within a transmission window of an SI-x message, wherein the SFN for the subframe numbered N is even and N is an integer from 1 to 5;

setting an RV sequence of four subframes other than the subframe numbered 5 in the five continuous subframes as $S_{RV}(\mathbf{0})$, $S_{RV}(\mathbf{1})$, $S_{RV}(\mathbf{2})$, $S_{RV}(\mathbf{3})$; and setting an RV of the subframe numbered 5 as $S_{RV}=(\lfloor(n_f \bmod 8)/2\rfloor)$, wherein $n_f$ stands for the SFN and $S_{RV}=\{S_{RV}(\mathbf{0}), S_{RV}(\mathbf{1}), S_{RV}(\mathbf{2}), S_{RV}(\mathbf{3})\}$.

* * * * *